United States Patent
Eun et al.

(10) Patent No.: US 7,290,279 B2
(45) Date of Patent: Oct. 30, 2007

(54) ACCESS CONTROL METHOD USING TOKEN HAVING SECURITY ATTRIBUTES IN COMPUTER SYSTEM

(75) Inventors: Sung Kyong Eun, Daejeon (KR); Jeong Nyeo Kim, Daejeon (KR); Jong Gook Ko, Daejeon (KR); So Young Doo, Daejeon (KR); Joon Suk Yu, Kyungki-do (KR); Jae Deok Lim, Daegu (KR)

(73) Assignee: Electronics and Telecommunications Research Institute (KR)

( * ) Notice: Subject to any disclaimer, the term of this patent is extended or adjusted under 35 U.S.C. 154(b) by 772 days.

(21) Appl. No.: 10/280,907

(22) Filed: Oct. 25, 2002

(65) Prior Publication Data

US 2003/0200436 A1 Oct. 23, 2003

(30) Foreign Application Priority Data

Apr. 17, 2002 (KR) .............................. 2002-20800

(51) Int. Cl.
*H04L 9/32* (2006.01)
(52) U.S. Cl. .............................. 726/9; 726/20; 713/185
(58) Field of Classification Search .................... 726/2, 726/4, 9, 17, 20, 27; 713/182, 185
See application file for complete search history.

(56) References Cited

U.S. PATENT DOCUMENTS

| | | | | |
|---|---|---|---|---|
| 6,055,637 A * | 4/2000 | Hudson et al. | ............... | 726/20 |
| 6,122,631 A * | 9/2000 | Berbec et al. | .................. | 707/9 |
| 6,279,111 B1 * | 8/2001 | Jensenworth et al. | ......... | 726/10 |
| 6,308,273 B1 * | 10/2001 | Goertzel et al. | ............... | 726/9 |
| 6,308,274 B1 * | 10/2001 | Swift | ............................. | 726/9 |
| 6,385,701 B1 * | 5/2002 | Krein et al. | ................. | 711/141 |
| 6,845,908 B2 * | 1/2005 | Morita et al. | ............... | 235/382 |
| 6,947,556 B1 * | 9/2005 | Matyas et al. | ................ | 380/29 |
| 2001/0042124 A1 * | 11/2001 | Barron | ....................... | 709/227 |
| 2002/0073336 A1 * | 6/2002 | Toy et al. | ................... | 713/201 |

(Continued)

FOREIGN PATENT DOCUMENTS

| | | |
|---|---|---|
| JP | 11-338824 | 12/1999 |
| KR | 10-1996-064194 | 12/1996 |
| KR | 1019990022052 | 6/1999 |
| KR | 000038184 | 7/2000 |
| KR | 010064759 | 7/2001 |

*Primary Examiner*—Christopher Revak
(74) *Attorney, Agent, or Firm*—Blakely, Sokoloff, Taylor & Zafman

(57) ABSTRACT

Disclosed is an access control method using a token having security attributes in a computer system when a user gains access to a specific file. The computer system adopts a token having encryption, modification, execution, and provision attributes to determine access permission or access denial between a user and a file in such a way that a file access request is controlled. The access control method enciphers a file and stores the enciphered file in a storage unit, so that it can maintain security of the file even though the storage unit is stolen. The access control method enables a system manager to read only enciphered contents of the file when the system manager performs a data backup operation, thereby eliminating limitations in commonly operating a system simultaneously with maintaining file security. The access control method enables programs for executing operations on behalf of a user to automatically obtain a corresponding token, confirms authority to execute the file, and prevents that the authority is stolen or drained due to a program error.

10 Claims, 6 Drawing Sheets

U.S. PATENT DOCUMENTS

2002/0099952 A1* 7/2002 Lambert et al. ............ 713/200
2003/0081790 A1* 5/2003 Kallahalla et al. .......... 380/281
2004/0015585 A1* 1/2004 McBrearty et al. ......... 709/225
2007/0005961 A1* 1/2007 Hamblin et al. ............ 713/167
2007/0006283 A1* 1/2007 Verbowski et al. ............ 726/2

* cited by examiner

ACCESS CONTROL METHOD USING TOKEN HAVING SECURITY ATTRIBUTES IN COMPUTER SYSTEM

BACKGROUND OF THE INVENTION

1. Field of the Invention

The present invention relates to a method for controlling a allowance or denial of an access request from a user in the case where the user attempts to access for a specific object such as a directory, device, and general file, etc. (i.e., all the objects of which names are given by a storage device) stored in a storage device, and more particularly to a file access control method using a token having security attributes in a computer system where the token and its attributes, which were assigned to a file when it was generated, is used for access decision of a user to a specific file.

2. Description of the Related Art

Typically, various kinds of file access control methods for security, such as a MAC (Mandatory Access Control) method, an DAC (Discretionary Access Control) method, and a RBAC (Role-Based Access Control) method, etc., have been widely used.

Firstly, a MLS (Multi Level Security) method being one of the MAC methods limits access to an object on the basis of confidentiality of information contained in an object and authority of a subject, and is defined as an information flow control policy because it protects information flow ranging from a high-grade object to a low-grade object. Two regulations for controlling such information flow are a No-Read-UP regulation for preventing a low-grade subject from reading a high-grade object, and a No-Write-Down regulation for preventing a high-grade subject from writing in a low-grade object. Therefore, information confidentiality is ensured using the No-Read-Up regulation, and illegal information flow is prevented using the No-Write-Down regulation.

However, the aforementioned MAC is compatible with access control policy requirements of the government or military facilities, but is not compatible with access control policy requirements of a commercial field. For example, in order to provide an outside user with readable/unwritable information, the outside user must have a higher grade than an inside user who produces this readable/unwritable information. In this case, there is a disadvantage in that the outside user has authority to read all information produced by the inside user.

Secondly, an ACL (Access Control List) method being one of DAC (Discretionary Access Control) policies, is extention of the UNIX permission method. By ACL, a user can assign more permission to particular user or group besides typical permissions related to a user, group, and other based on a typical UNIX operating system. However, the ACL method has the same disadvantages as a DAC method even though it can be more finely controlled.

Firstly, a control component in DAC attributes has no knowledge of meaning of data because it is wholly based on an identity of a subject. Secondly, since the control in DAC attributes determines access permission or access denial on the basis of an identity of a subject, it is ineffective in that access may be permitted using other person's identity instead of the subject's identity, and it is also ineffective to protect against Trojan horse problem.

Finally, the Role Based Access Control method determines user's access to information on the basis of an individual role (or duty) within a system, instead of an individual identity, and is an access control policy appropriate for access control requirements of commercial fields. The Role Based Access Control method has three kinds of basic factors, i.e., a user, a role, and permission. In the case where the Role Based Access Control method performs a real access control test using the three basic factors, a user can gain access to a corresponding file on condition that he or she belongs to constituent members having authority to access the corresponding file. The Role based Access Control method has an advantage in that it facilitates operation and security management of an overall system. For instance, since the Role Based Access Control method has a variety of roles such as a security management role, a system management role, and a Web management role, etc., it enables only a particular user belonging to a corresponding role to handle system security and operation management in such a way that authority of a root user can be divided into many roles. Also, the Role Based Access Control method need not change permissions of all files even though a manager is changed to a new manager, but needs to insert the new manager into constituent members of a corresponding role, thereby facilitating security management.

However, the Role Based Access Control method unavoidably contains several variable components which shall be changed according to application area, so that it has been used only for the limited application levels such as a database and a Work-Flow system, thereby limiting the number of available application fields.

SUMMARY OF THE INVENTION

Therefore, the present invention has been made in view of the above problems, and it is an object of the present invention to provide an access control method using a token having security attributes in a computer system, for providing system security simultaneously with satisfying requirements of commercial fields.

It is another object of the present invention to provide an access control method using a token having security attributes in a computer system, for providing a first function to enable only a permitted user to delete or correct a specific file, providing a second function to enable only a permitted user to read a specific file, providing a third function to enable only a permitted user to execute a specific file, in order to accomplish flexibility and security of commercial fields and eliminate limitations in operating a commercialized system in case of using the above three functions.

In accordance with the present invention, the above and other objects can be accomplished by the provision of an access control method using a token having security attributes in a computer system for determining allowance or denial of access if a user process attempts to access a specific file stored in a storage unit, comprising the steps of: a) allowing a computer system to assign a token having security attributes to a user granted to access an arbitrary file and a corresponding file; b) allowing a user process to check an access request related to an arbitrary file; c) determining whether an access-requested file contains the token having security attributes; and d) permitting access to a corresponding file if the corresponding file has no token, determining whether a user generating the access request has the same token as the corresponding file if the corresponding file has the token, and determining access grant or access denial upon receiving the determination result.

Preferably, in case of providing a user with a token in the step (a), the user is assigned a token name or number, and the file is assigned a token and an attribute related to the token in such a way that only a permitted user can gain access to a specific file.

Preferably, the token assigned in the step (a) has at least one of an encryption attribute for indicating permission related to encryption/decoding of a file, a modification attribute for indicating permission related to a modification such as file deletion or correction, an execution attribute for indicating permission related to file execution, and a provision attribute for assigning a corresponding token to an arbitrary user if the arbitrary user process attempts to execute a file.

Preferably, the present invention enciphers a file having an encryption attribute, and stores the enciphered file. If a user attempts to read a file having an encryption attribute, the present invention decodes a corresponding file on condition that the user has the same token as the file, and provides the user with the decoded file. Otherwise, if the user does not have the same token as the file, the present invention provides a user process with an enciphered file state without decoding the file in such a way that security for accessing a file is enhanced and limitations in commonly operating a system are removed.

Preferably, if a user attempts to read/write a file having the modification attribute, the present invention determines an access denial on condition that the user does not have the same token as the file, determines access permission on condition that the user has the same token as the file, and determines whether an encryption attribute is assigned to a corresponding file in case of correcting and storing the file. Therefore, if the corresponding file has the encryption attribute, the present invention enciphers the file, and stores the enciphered file. If the corresponding file has no encryption attribute, the present invention stores the corresponding file as it is.

Preferably, if an arbitrary user attempts to execute a file having a provision attribute, the present invention provides a corresponding user with a corresponding token, and executes the file.

Preferably, if a user attempts to execute a file having the execution attribute, the present invention determines access permission on condition that the user has the same token as the file and executes the file, or determines an access denial on condition that the user does not have the same token as the file.

Preferably, if the file has a provision attribute, the present invention removes all tokens assigned to a user by the provision attribute, provides a user with a corresponding token, and executes a corresponding file.

Preferably, the present invention allows a user process to receive all tokens assigned to a corresponding user if the user process gains access to the computer system, or allows a user process to selectively receive the tokens if the user process gains access to the computer system.

Preferably, the present invention provides the child process with all tokens contained in a parent process if the user process generates a child process.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
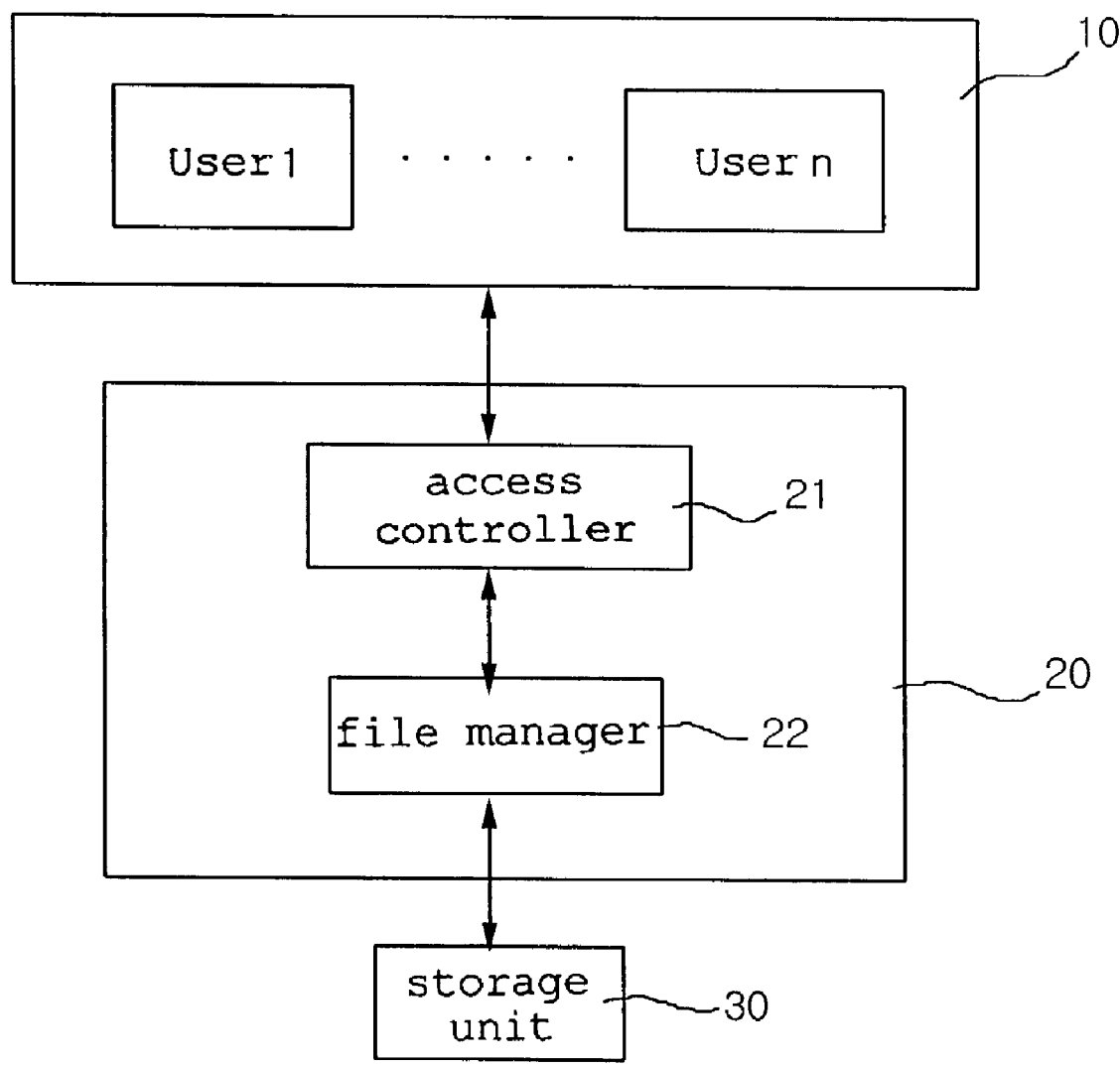
FIG. 1 is a view illustrating a block diagram of a computer system in accordance with the present invention.

Now, preferred embodiments of the present invention will be described in detail with reference to the annexed drawings.

An access control method using tokens in accordance with the present invention mainly comprises the steps of providing a user and a file with tokens, and determining whether there is a user's request to access a specific file using the tokens assigned to the user and file.

Such a token for use in the access control method in accordance with the present invention indicates a distinguishable name or number, and is a value determined for every file. The token has the same concept as an attribute such as a stored date assigned to a file without affecting a file size in such a way that it is adapted to display file information. The token can perform a file access control procedure by assigning security attributes to a specific bit.

Therefore, the step for providing a user and file with a token is equal to a step for providing a user and file with the aforesaid security attributes. In this case, a token itself having the inventive security attributes is assigned to the file, and a name or number of the token is assigned to a user authorized to access the file in such a way that a correlation between the file and the user can be recognized using the token.

Four kinds of security attributes (i.e., an encryption attribute (Attribute-S), a modification attribute (Attribute-I), an execution attribute (Attribute-X), and a provision attribute (Attribute-A)) assigned to the aforesaid token will hereinafter be described in more detail.

Firstly, as for the encryption attribute (Attribute-S), a file having the Attribute-S enciphers its own contents, stores the enciphered contents, and provides its own decoded contents to only a process having the same token. But, the encryption attribute (Attribute-S) enables other processes not having the same token to receive enciphered contents without decoding them.

Secondly, as for the modification attribute (Attribute-I), a file having the Attribute-I permits deletion and correction on only a process having the same attribute as the Attribute-I.

Thirdly, as for the execution attribute (Attribute-X), a file having the Attribute-X allows a process having the same attribute as the Attribute-X to be executed.

Fourthly, as for the provision attribute (Attribute-A), in the case where a file having the Attribute-A is executed by an arbitrary process, a token of the file is provided to the arbitrary process.

Further, in the case where a token having the above attributes is provided to a user or file, the following regulations may be applied to this case.

Firstly, many tokens may be used for the above case, and a security manager only performs generation/modification/deletion of tokens. Herein, the security manager indicates a particular user discriminated from a system operation manager and a general system user.

Secondly, many tokens are assigned to each user, and such token provision for each user is executed by a security manager only.

Thirdly, a single token only is assigned to a file, and provisions of both a token and an attribute in the file can be executed by only a file owner and a security manager.

In the case where a user requests access to a specific file after the token is assigned to the file and the user, the following regulations (a)~(g) are adapted to determine an access permission or an access denial using the token assigned to the user and file.

a) In case of accessing a system, a user receives all tokens assigned to himself or herself, or selectively receives the tokens.

b) Provided that an encryption attribute is given to a specific file, the specific file is stored in the encryption form using a key related to a corresponding token.

c) In the case where an arbitrary user process attempts to read a file having the encryption attribute (Attribute-S), a decoded format file is provided to the user process on condition that the user process has the same token as the file, but an encryption format file is provided to the user process without decoding the file on condition that the user process does not have the same token as the file.

d) In the case where an arbitrary user process attempts to delete or correct a file having a modification attribute (Attribute-I), deletion or correction of the file is permitted on condition that the user process has the same token as the file.

e) In the case where an arbitrary user process attempts to execute a file having an execution attribute (Attribute-X), execution of the file is permitted on condition that the user process has the same token as the file.

f) In the case where an arbitrary user process attempts to execute a file having a provision attribute (Attribute-A), a token assigned to the file is provided to the user process. In case of completing the file execution, the token assigned to the file by the provision attribute (Attribute-A) is removed.

g) In the case where a user process generates a child process, the child process is assigned all tokens contained in a parent process.

Operations based on the aforementioned regulations will hereinafter be described with reference to the annexed drawings.

FIG. 1 depicts a block diagram of a computer system adopting an access control method using a token having security attributes in accordance with the present invention. Referring to FIG. 1, the computer system includes N user processes 10, where N is an integer equal to or greater than 1, an operating system (OS) 20 for receiving a user's request from the user process 10 and processing it, and a storage unit 30 for storing information in the form of a file.

The operating system (OS) 20 includes an access controller 21 for determining either access permission or access denial related to a file of the user process 10, and a file manager 22 for managing the storage unit 30. The access controller 21 can be operated by only an access control method using a token in accordance with the present invention, or can be operated by the access control method using a token along with a typical access control method. But, only the access control method using a token in accordance with the present invention will hereinafter be described for the convenience of description and better understanding of the present invention.

FIGS. 2-6 are flow charts illustrating access control procedures using a token in accordance with the present invention.

Figure 2:
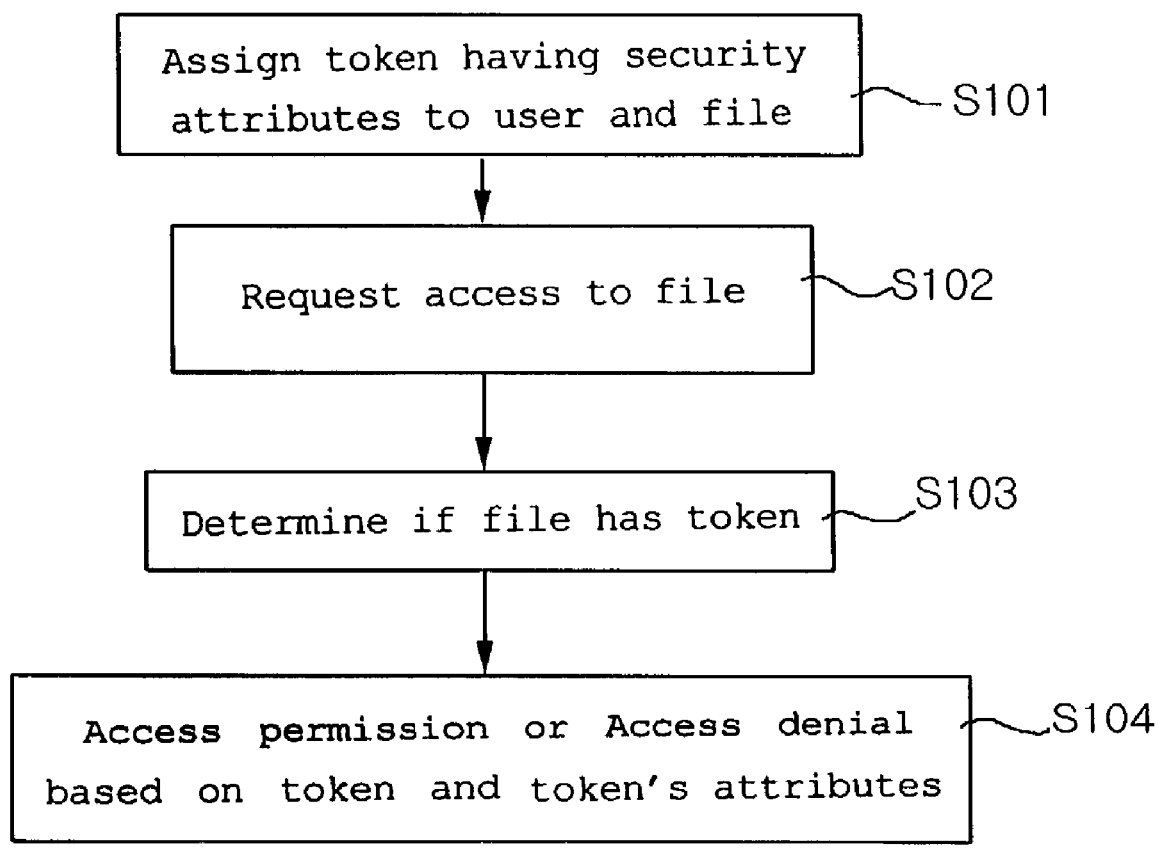
FIG. 2 is a flow chart illustrating a file access control procedure in accordance with the present invention.

Referring to FIG. 2, a token is provided to a file stored in a storage unit 30 and a user accessible to the file at step S101. In this case, a token provision method and all kinds of the token are the same as the aforementioned.

In the case where a user attempts to access a specific file, an access request signal is transmitted from a user process 10 to an access controller 21 at step S102. The access controller 21 receives the access request signal, and determines whether a corresponding file has a token at step S103.

If the corresponding file has no token at step S103, then access permission is determined at step S104. If the corresponding file has a token at step S103, one of access permission and access denial is determined based on an attribute of the token at step S104, and is then processed.

Access control procedures performed according to the token attributes will be described in more detail with reference to FIGS. 3~6.

Figure 3:
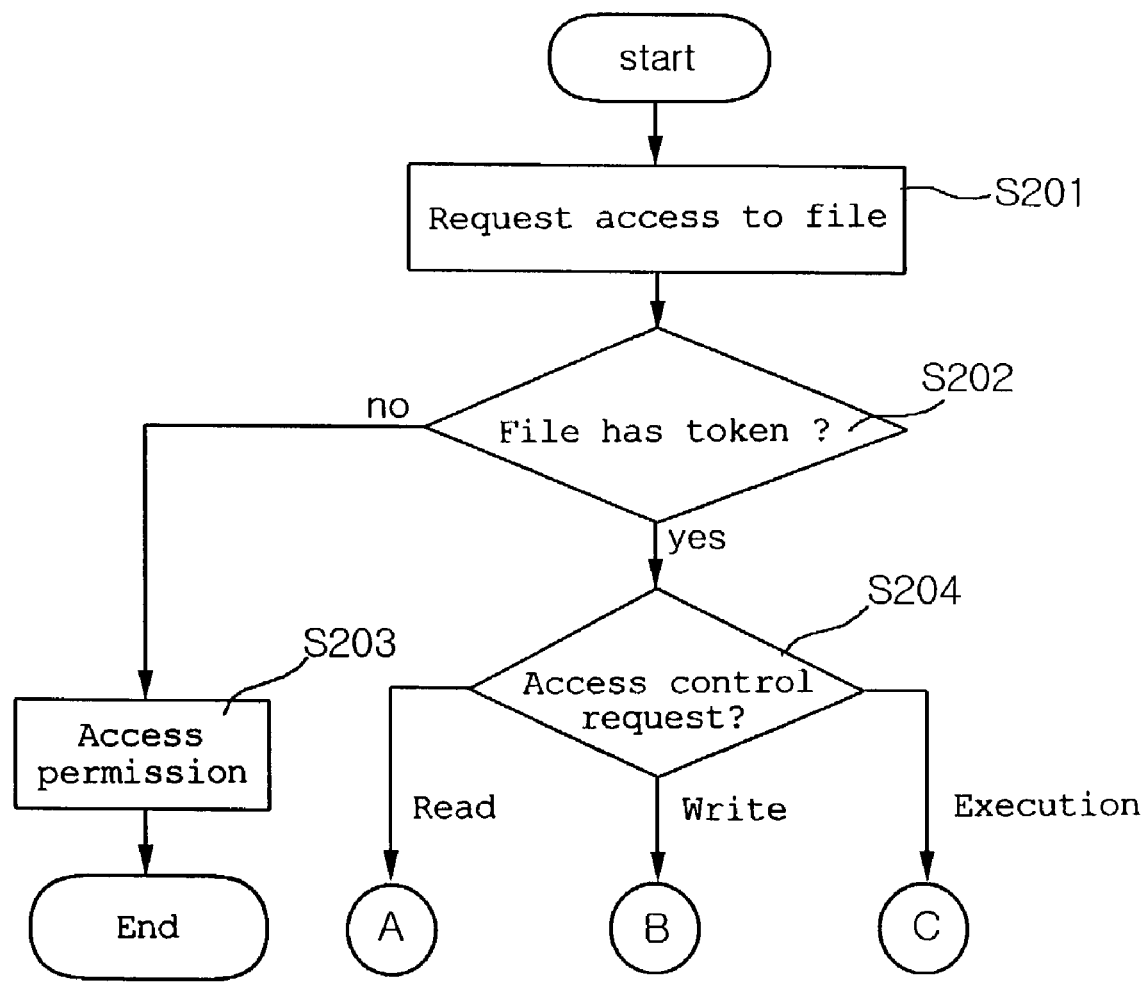
FIGS. 3-6 are flow charts illustrating file access control procedures provided in the case where there is a file access request signal in accordance with the present invention.

Referring to FIG. 3, if a user generates an access request signal to access an arbitrary file at step S201, an access controller 21 determines whether a corresponding file has a token at step S202. If the corresponding file has no token at step S202, the access controller 21 immediately determines access permission at step S203.

Otherwise, if the corresponding file has a token at step S202, the access controller 21 determines the kind of access control request signals at step S204. There are three kinds of access control request signals, i.e., a Read, Write (or Delete), and Execution requests. Therefore, an access control procedure is changed according to the kind of the access control request signals such as Read, Write (or Delete), and Execution requests.

Figure 4:
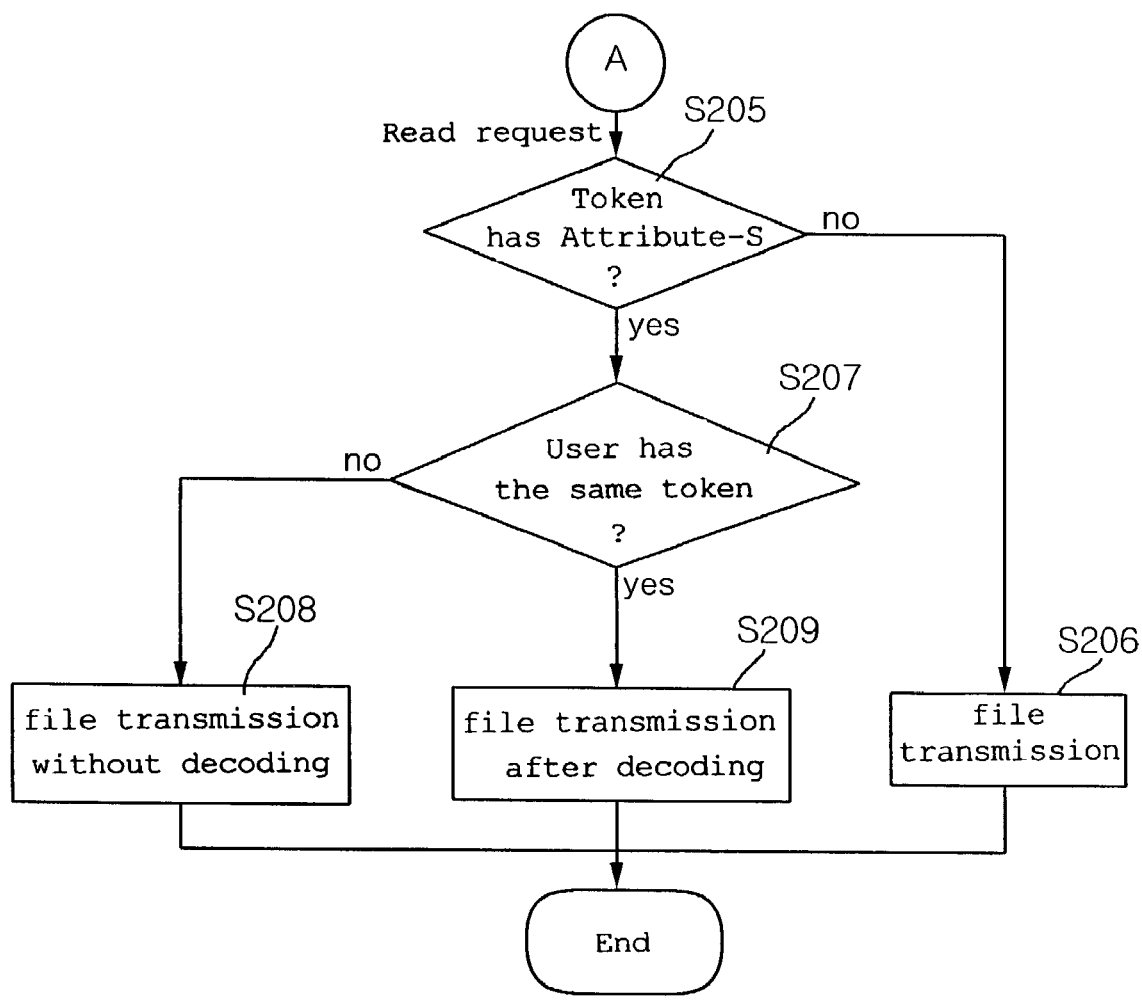

Referring to FIG. 4, in the case where the access control request signal is a Read request, an access controller 21 determines at step S205 whether a token contained in a corresponding file has an encryption attribute (Attribute-S). In the case where the token has no encryption attribute (Attribute-S) at step S205, the access controller 21 transmits contents of the requested file to a user process 10 at step S206.

On the other hand, in the case where a corresponding token contains an encryption attribute at step S205, it is determined at step S207 whether the same token as the file is assigned to a user. In this case, if the same token as the file is not assigned to the user at step S207, a corresponding file is transmitted to a user process 10 without decoding the file itself at step S208. If the same token as the file is assigned to a user, a corresponding file is decoded, and is then transmitted to the user process 10 at step S209. Herein, the corresponding file in the step S209 is enciphered by the encryption attribute (Attribute-S) in case of providing a user with a token, and is then stored in the form of encryption.

Figure 5:
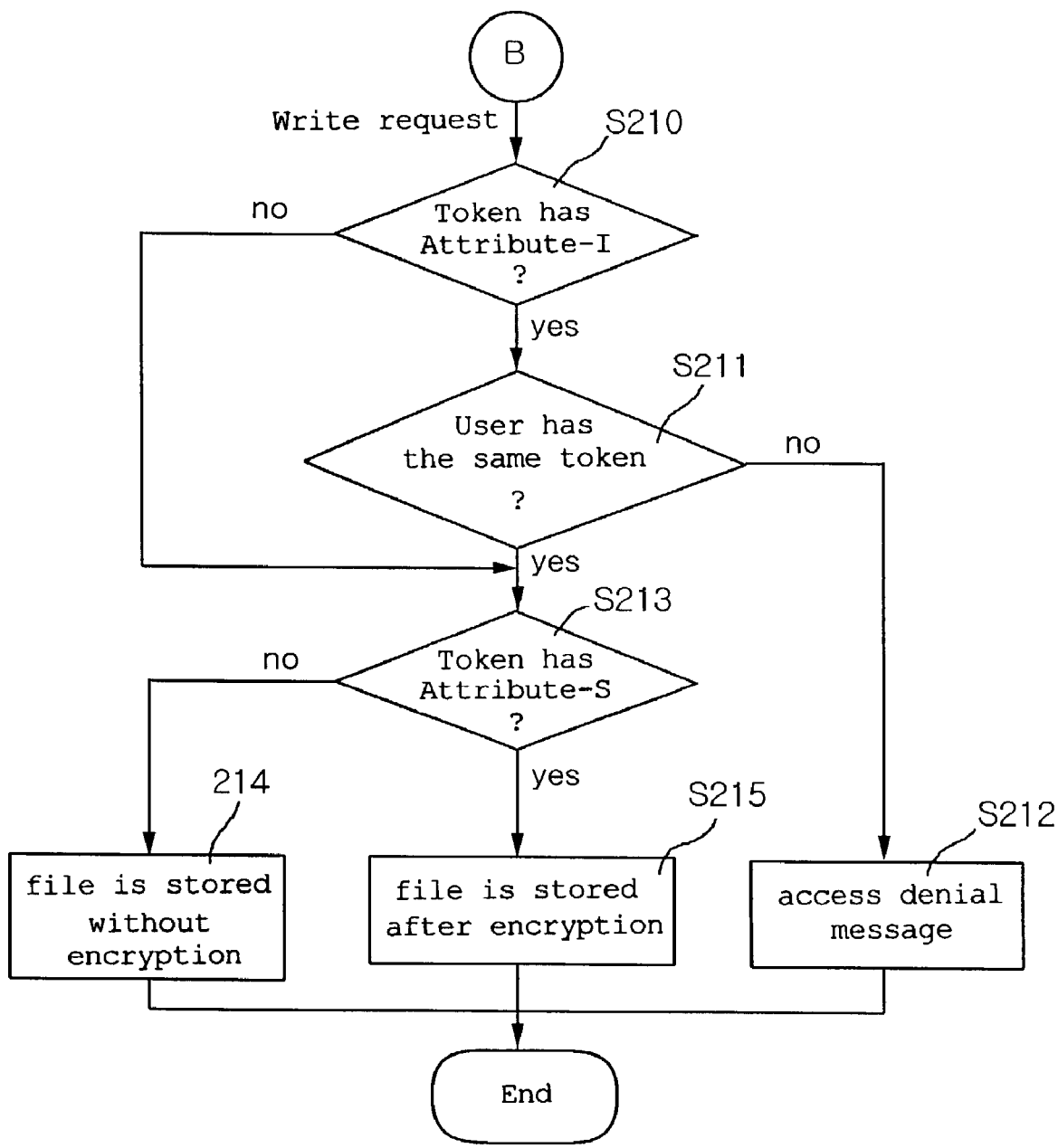

Meanwhile, as shown in FIG. 5, in the case where the access control request signal is a Write request, an access controller 21 determines at step S210 whether a token contained in an access-requested file has a modification attribute (Attribute-I). If the modification attribute (Attribute-I) is not contained in the file at step S210, the access controller 21 goes to step S213. If the modification attribute (Attribute-I) is contained in the file at step S210, it is determined at step 211 whether the same token as the file is assigned to a user. In this case, if it is determined at step S211 that the same token is not assigned to the user and the file, the access controller 21 outputs an access denial message to the user process 10 at step S212, and then a program is terminated. But, if it is determined at step S211 that the same token is assigned to the user and the file, the access controller 21 outputs an access permission message to the user process 10 and goes to step S213.

The access controller 21 determines at step S213 whether a token contained in the file has the encryption attribute (Attribute-S). If it is determined at step S213 that the encryption attribute (Attribute-S) is not contained in the token, a file written by a user's Write request is stored in a storage unit 30 without enciphering the file itself at step S214. If it is determined at step S213 that the encryption attribute (Attribute-S) is contained in the token, the access controller 21 contains contents transmitted from the user process 10 in a file, enciphers the contents, and then stores the enciphered contents in the storage unit 30 at step S215.

Figure 6:
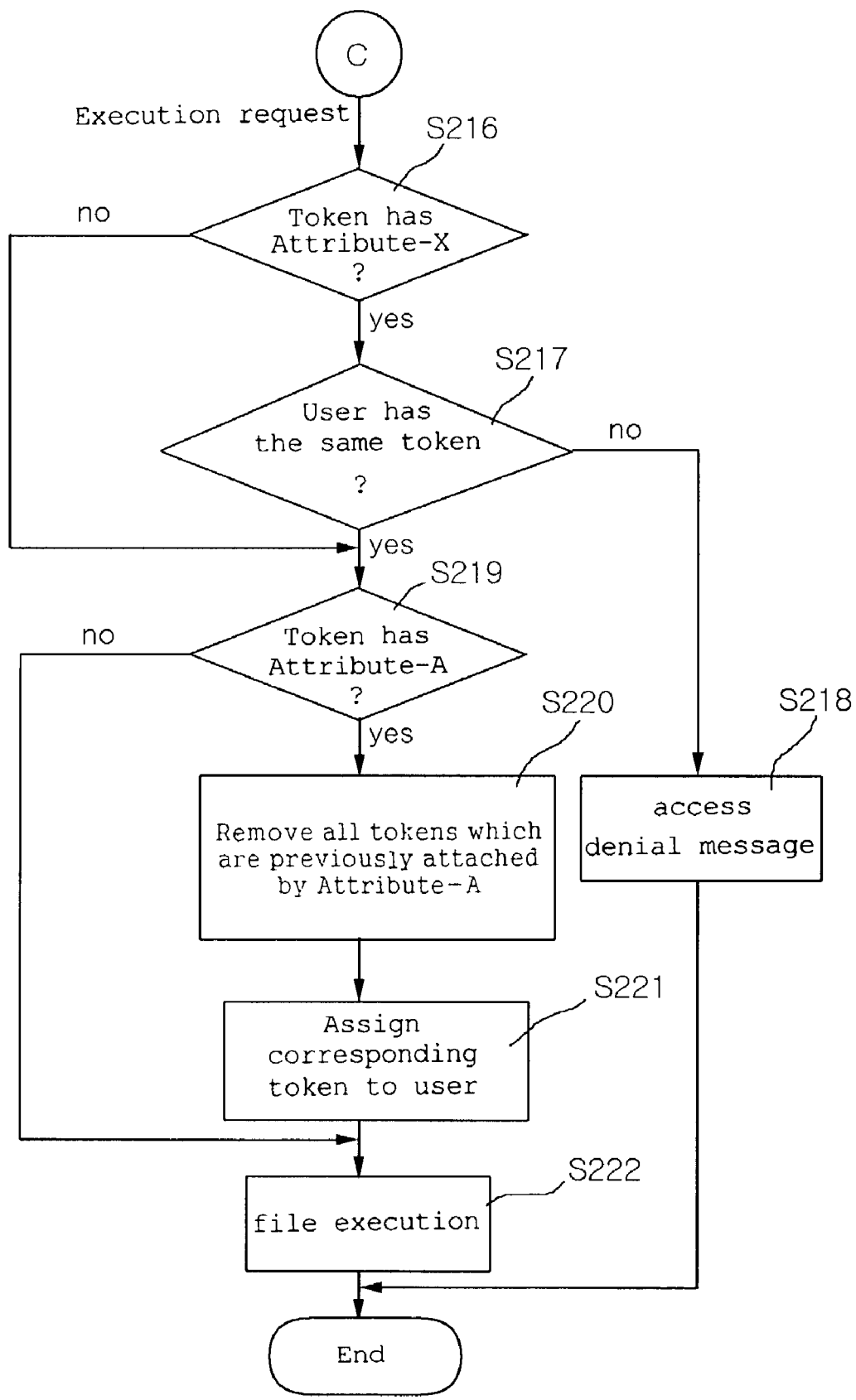

As shown in FIG. 6, in the case where the access control request signal is an Execution request, an access controller 21 determines at step S216 whether a token contained in a file has an execution attribute (Attribute-X). If the execution attribute (Attribute-X) is not contained in a corresponding token of the file at step S216, the access controller 21 goes to step S219. If the execution attribute (Attribute-X) is contained in a corresponding token of the file at step S216, it is determined at step S217 whether the same token as the file is assigned to a user. If the user has the same token as the file at step S216, the access controller 21 goes to step S219. If the user does not have the same token as the file at step S216, the access controller 21 transmits an access denial message to the user process 10 at step S218, and then a program is terminated.

The access controller 21 determines at step S219 whether a token contained in the file has a provision attribute (Attribute-A). If it is determined at step S219 that the provision attribute (Attribute-A) is not contained in the token, the access controller 21 controls a corresponding file to be executed at step S222. If it is determined at step S219 that the provision attribute (Attribute-A) is contained in the token, the access controller 21 removes all tokens, which are automatically provided to the user by the provision attribute (Attribute-A), from the user at step S220, again provides the user with a token necessary for executing the corresponding file at step S221, and finally executes the corresponding file at step S222.

The aforementioned access control method using a token having security attributes will be more clearly understood with reference to the following description.

Assuming that a user A has two tokens B and C, this assumption is represented as $USER_A\{ST_B, ST_C\}$. Assuming that a token E assigned to a file D includes a modification attribute (Attribute-I), an encryption attribute (Attribute-S), a provision attribute (Attribute-A), and an execution attribute (Attribute-X), and contains contents of "XXX", this assumption is represented as $FILE_D\{ST_E<SIXA>\}$="XXX", where S indicates an encryption attribute (Attribute-S), I indicates a modification attribute (Attribute-I), X indicates an execution attribute (Attribute-X), and A indicates a provision attribute (Attribute-A).

It is assumed that the following users and files exist in an initial state.

Users: $USER_A\{ST_I, ST_J, ST_K\}$, $USER_B\{ST_J\}$, $USER_C\{ST_K\}$

Files: $FILE_D\{\ \}$="FOX", $FILE_E\{\ \}$="WOLF", $FILE_F\{\ \}$="SNAKE"

And, it is also assumed that the $USER_C$ is an owner of $FILE_E$ and $FILE_F$, and each user has ACL (Access Control List) Read/Write authority with respect to all the files.

Herein, in the case where the user $USER_C$ provides the file $FILE_E$ with a token "$ST_K$<-I-->" having a modification attribute and provides the file $FILE_F$ with a token "$ST_K$<S-->" having an encryption attribute, states of the files are changed as follows:

$FILE_D\{\ \}$="FOX", $FILE_E\{ST_K$<-I-->$\}$="WOLF", $FILE_F\{ST_K$<S-->$\}$="X?&$@"

In case of the file $FILE_F$, the file $FILE_F$ indicates that contents of a corresponding file are enciphered according to the above encryption attribute determination method.

Under this condition, provided that all users attempt to read the file $FILE_F$, the users $USER_A$ and $USER_C$ can receive decoded original contents "SNAKE" because they have a token $ST_K$, respectively. The user $USER_B$ receives enciphered contents "X?&$@" because he or she does not have a token $ST_K$ for the file $FILE_F$.

In the case where the user $USER_A$ requests a Write request signal for writing a word "IS" in the file $FILE_E$, the user $USER_B$ requests a Write request signal for writing a word "ME" in the file $FILE_E$, and the $USER_C$ requests a Write request signal for writing a word "YOU" in the file $FILE_E$, the Write request signal is permitted to the users $USER_A$ and $USER_C$ because the users $USER_A$ and $USER_C$ have a token $ST_K$, respectively, but is not permitted to the remaining user $USER_B$. Accordingly, the contents of the file $FILE_E$ are changed as follows:

$FILE_D\{\ \}$="FOX", $FILE_E\{ST_K$<-I-->$\}$="WOLF IS YOU", $FILE_F\{ST_K$<S-->$\}$="X?&$@"

Then, it is assumed that an execution file defined as $FILE_G\{ST_M$<--A>$\}$ exists. This execution file has a token having security attributes, but has only a provision attribute (Attribute-A) as an attribute value in such a way that even a user having no token having security attributes can execute the execution file. As a result, a user process for executing this file is assigned the token "$ST_M$" according to the aforementioned regulations. In the case where the user process functioning as a parent process generates a child process, the child process inherits the same token as the parent process. However, in the case where these processes attempt to execute a new program, a token assigned by a provision attribute is removed as shown in FIG. 6. As a result, the access control method shown in FIG. 6 prevents a root shell from being generated in a daemon process having security errors, due to an attack such as a buffer-overflow.

Next, a preferred embodiment for applying an access control method using a token having security attributes to accomplish Web page protection will hereinafter be described in detail.

In the preferred embodiment, it is assumed that a program "httpd" is adapted to accomplish a Web page service, the program "httpd" is operated in the form of daemon, a homepage file is set to "index.html", a setup file is set to "httpd.conf", and a homepage manager is a specific user "$USER_{httpd}$".

The file "index.html" is a Web page provided by a program "httpe", so that a program "httpd" of the manager "$USER_{httpd}$" reads and corrects the file "index.html". However, the remaining users other than the manager "$USER_{httpd}$" can only read the file "index.html", whereas they cannot correct the file "index.html". Since the setup file contains information of Web page construction, only the program "httpd" of the manager "$USER_{httpd}$" can read and correct the file "index.html". For this purpose, a token is assigned to the file and the user as follows:

$USER_{httpd}\{ST_{httpd}\}$ $FILE_{httpd}\{ST_{httpd}$<--A>$\}$, $FILE_{index.html}\{ST_{httpd}$<-I-->$\}$, $FILE_{httpd.com}\{ST_{httpd}$<SI-->$\}$ Therefore, since the manager "$USER_{httpd}$" has a token "$ST_{httpd}$", he or she can read and correct the files "index.html" and "httpd.conf", thereby performing a Web page management. However, other users (containing a root user) having no token "$ST_{httpd}$" cannot correct the files "index.html" and "httpd.conf". In particular, in case of reading the file "httpd.conf", the other users other than the manager "$USER_{httpd}$" receive encryption data of the file "httpd.conf so that they cannot recognize contents of the file "httpd.conf".

Although the program "httpd" for executing the file is assigned a token "$ST_{httpd}$", it has only a provision attribute (Attribute-A) so that anyone can execute the program "httpd". In case of executing the program "httpd", anyone can be assigned a token "$ST_{httpd}$". Therefore, the program "httpd" has the same authority as the manager $USER_{httpd}$ after it has been executed, so that it can have free access to the files "httpd.conf" and "index.html".

In the case where an inside or outside invader attempts to execute a shell or other program due to security errors contained in the program "httpd", the provision token "$ST_{httpd}$" is removed as shown in FIG. 6. As a result, the program "httpd" has no authority to read/write the file "httpd.conf", and also has no authority to write the file "index.html".

As apparent from the above description, an access control method in accordance with the present invention enciphers a file using an encryption attribute (Attribute-S) and stores the enciphered file in a storage unit, so that it can maintain security of the file even though the storage unit is stolen. The access control method enables a system manager to read only enciphered contents of the file when the system manager performs a data backup operation, thereby eliminating common limitations in operating a system simultaneously with maintaining file security.

Further, since the access control method according to the present invention uses a provision attribute (Attribute-A), it enables programs for executing operations on behalf of a user to automatically obtain a corresponding token. Since the access control method uses a modification attribute (Attribute-I), it can control deletion or modification of the file contents. Since the access control method uses an execution attribute (Attribute-X), it confirms authority to execute the file. And, since the access control method removes a token automatically assigned by the provision attribute (Attribute-A), it can prevent authority from being stolen or drained due to a program error. Furthermore, since the access control method according to the present invention controls a user's access request using a token having such attributes, it can provide a computer system being commercially managed with flexibility and security at the same time, whereas a conventional access control method cannot provide a computer system with the flexibility and security.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An access control method using a token having security attributes in a computer system for determining access permission and access denial if a user process attempts to access a specific file stored in a storage unit, comprising the steps of:
   a) assigning a first token having security attributes to a user process and the second token having security attributes to a file;
   b) checking a request by the user process to access an arbitrary file;
   c) determining whether the arbitrary file contains a third token having security attributes; and
   d) if the arbitrary file contains no token, and permitting access to the arbitrary file, and
   if the arbitrary file contains the third token, and permitting access according to a determination based on the first token and the third token, and
   if the third token has a provision attribute, then removing all automatically provisioned tokens from the user process before providing the user process with a token for executing arbitrary file, then executing the arbitrary file.

2. The access control method as set forth in claim 1, wherein the step (a) includes the steps of:
   providing the user process with a name or number of the first token; and
   providing the file with the second token and an attribute related to the second token.

3. The access control method as set forth in claim 1, wherein the tokens assigned in the step (a) have at least one of an encryption attribute for indicating permission related to encryption/decoding of a file, a modification attribute for indicating permission related to a modification such as file deletion or correction, an execution attribute for indicating permission related to file execution, and a provision attribute for assigning a corresponding token to an arbitrary user if the arbitrary user process attempts to execute the file.

4. The access control method as set forth in claim 3, wherein the step (a) includes the steps of:
   enciphering a file having the encryption attribute using a key related to a corresponding token; and
   storing the enciphered file.

5. The access control method as set forth in one of claims 1 to 3, wherein the step (d) includes the steps of:
   if a user attempts to read a file having an encryption attribute, decoding a corresponding file on condition that the user has the same token as the file, and providing the user with the decoded file; and
   if the user does not have the same token as the file, providing a user process with an enciphered file state without decoding the file.

6. The access control method as set forth in one of claims 1 to 3, wherein the step (d) includes the steps of:
   if a user attempts to read/write a file having the modification attribute, determining access denial on condition that the user does not have the same token as the file;
   determining access permission on condition that the user has the same token as the file;
   determining whether an encryption attribute is assigned to a corresponding file in case of correcting and storing the file;
   if the corresponding file has the encryption attribute, enciphering the file, and storing the enciphered file; and
   if the corresponding file has no encryption attribute, storing the corresponding file as it is.

7. The access control method as set forth in one of claims 1 to 3, wherein the step (d) includes the steps of:
   if a user attempts to execute a file having the execution attribute, determining access permission on condition that the user has the same token as the file, and executing the file; and
   determining an access denial on condition that the user does not have the same token as the file.

8. The access control method as set forth in claim 1, wherein the step (a) includes the step of:
   allowing a user process to receive all tokens assigned to a corresponding user if the user process gains access to the computer system, or allowing a user process to selectively receive the tokens if the user process gains access to the computer system.

9. The method as set forth in claim 1, further comprising the step of:
if the user process generates a child process, providing the child process with all tokens contained in a parent process.

10. A computer-readable recording medium for storing a program therein, the program comprising:
a first function for providing a token having security attributes, such as an encryption attribute, a modification attribute, an execution attribute, and a provision attribute, to a user permitted to access an arbitrary file and a corresponding file;

a second function for decoding a corresponding file on condition that the user has the same token as the file and providing the user with the decoded file in the case where a user attempts to read a file having an encryption attribute, or providing a user process with an enciphered file state without decoding the file in the case where a user does not have the same token as the file;

a third function for, in case of a write request of a user on a file having a modification attribute, determining an access denial on condition that a user does not have the same token as the file, determining access permission on condition that a user has the same token as the file, enciphering and storing the file on condition that a corresponding file has an encryption attribute, and directly storing the file as it is on condition that a corresponding file has no encryption attribute;

a fourth function for, in case of an execution request of a file having an execution attribute, determining an access denial of a user who does not have the same token as the file, and executing a corresponding file for a user who has the same token as the file; and a fifth function for, in case of an execution request of a file having a provision attribute removing all tokens assigned to a user by the provision attribute; before providing the user with a corresponding token, and executing a corresponding file.

* * * * *